(12) United States Patent
Hatam-Tabrizi et al.

(10) Patent No.: US 6,330,209 B1
(45) Date of Patent: Dec. 11, 2001

(54) LOAD AND UNLOAD CONTROL FOR MAGNETO-OPTICAL DISK DRIVE

(75) Inventors: Shahab Hatam-Tabrizi, San Jose; Hong Khuu, Fremont, both of CA (US)

(73) Assignee: Maxoptix Corporation, Fremont, CA (US)

( * ) Notice: Subject to any disclaimer, the term of this patent is extended or adjusted under 35 U.S.C. 154(b) by 0 days.

(21) Appl. No.: 09/477,033

(22) Filed: Jan. 3, 2000

Related U.S. Application Data

(63) Continuation-in-part of application No. 09/026,798, filed on Feb. 20, 1998, now Pat. No. 6,104,675.

(51) Int. Cl.$^7$ .................................................. G11B 11/00
(52) U.S. Cl. ............................................................. 369/13
(58) Field of Search ........................... 369/13, 14, 75.2, 369/75.1, 77.2, 77.1, 215; 360/114, 59

(56) References Cited

U.S. PATENT DOCUMENTS

| | | |
|---|---|---|
| 4,449,138 | 5/1984 | Ando . |
| 4,788,671 | 11/1988 | Kanda . |
| 4,807,204 | 2/1989 | Mizutani et al. . |
| 4,965,780 | 10/1990 | Lee et al. . |
| 5,004,307 | 4/1991 | Kino et al. . |
| 5,105,408 | 4/1992 | Lee et al. . |
| 5,121,256 | 6/1992 | Corle et al. . |
| 5,125,750 | 6/1992 | Corle et al. . |
| 5,150,338 | 9/1992 | Birecki et al. . |
| 5,161,134 | 11/1992 | Lee . |
| 5,191,563 | 3/1993 | Lee et al. . |
| 5,197,050 | 3/1993 | Murakami et al. . |
| 5,202,880 | 4/1993 | Lee et al. . |
| 5,247,510 | 9/1993 | Lee et al. . |
| 5,255,260 | 10/1993 | Yamada et al. . |
| 5,276,674 | 1/1994 | Tanaka . |
| 5,303,100 | * 4/1994 | Nakayama et al. ................ 360/104 |
| 5,307,336 | 4/1994 | Lee et al. . |
| 5,497,359 | 3/1996 | Mamin et al. . |
| 5,533,001 | 7/1996 | Watanabe et al. . |
| 5,594,708 | * 1/1997 | Chaya ..................................... 369/13 |
| 5,625,607 | * 4/1997 | Chaya ..................................... 369/13 |
| 5,712,842 | 1/1998 | Yamamoto et al. . |
| 5,745,443 | 4/1998 | Yoshida et al. . |
| 5,745,464 | 4/1998 | Taguchi et al. . |
| 5,786,078 | 7/1998 | Sekiya et al. . |
| 5,790,483 | 8/1998 | Kawai . |
| 5,828,644 | 10/1998 | Gage et al. . |
| 5,838,646 | 11/1998 | Watanabe et al. . |
| 5,859,814 | 1/1999 | Kino et al. . |
| 5,910,932 | 6/1999 | Watanabe et al. . |
| 5,914,915 | 6/1999 | Watanabe et al. . |
| 5,970,037 | * 10/1999 | Kanazawa et al. ................ 369/77.2 |

FOREIGN PATENT DOCUMENTS 08-212579    8/1996    (JP) ........................................ 369/13

* cited by examiner

*Primary Examiner*—Tan Dinh
(74) *Attorney, Agent, or Firm*—Blakely, Sokoloff, Taylor & Zafman, LLP

(57) ABSTRACT

An apparatus for reading/writing data from/to a magnetic disk comprises an objective lens disposed in an actuator body for focusing laser light onto the magnetic disk. A magnetic head suspension assembly includes a magnetic recording head attached to the actuator body, a suspension arm having a proximate end fixedly attached to the actuator body, a distal end with a tab, and a gimbal located between the distal and proximate ends. The magnetic recording head is attached to the gimbal. A mechanism having an extending member moveable in a first direction engages and moves the tab until the magnetic recording head is placed in an unloaded position. The extending member moves in a second direction to release the tab such that the magnetic recording head is placed in a loaded position.

22 Claims, 11 Drawing Sheets

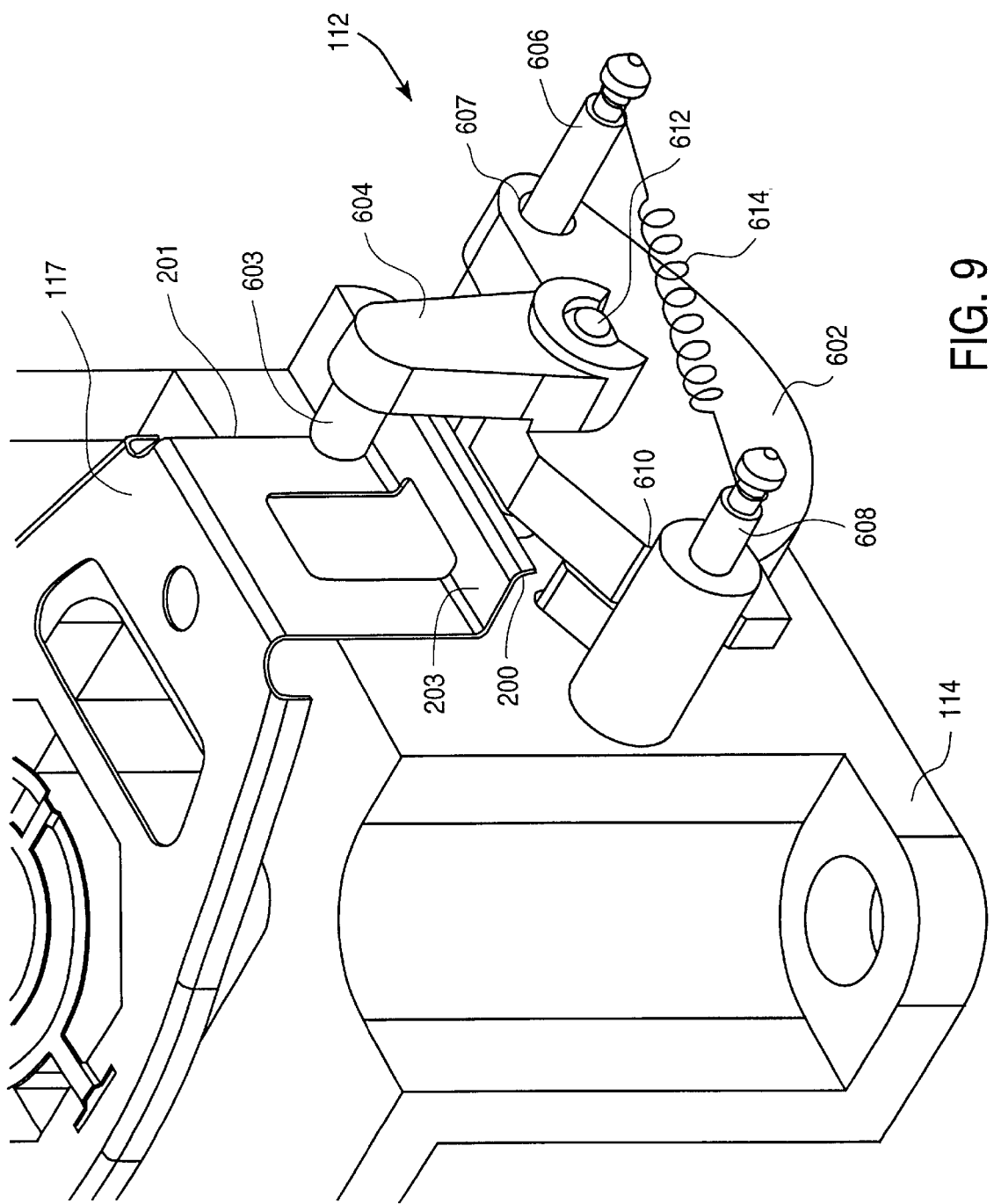

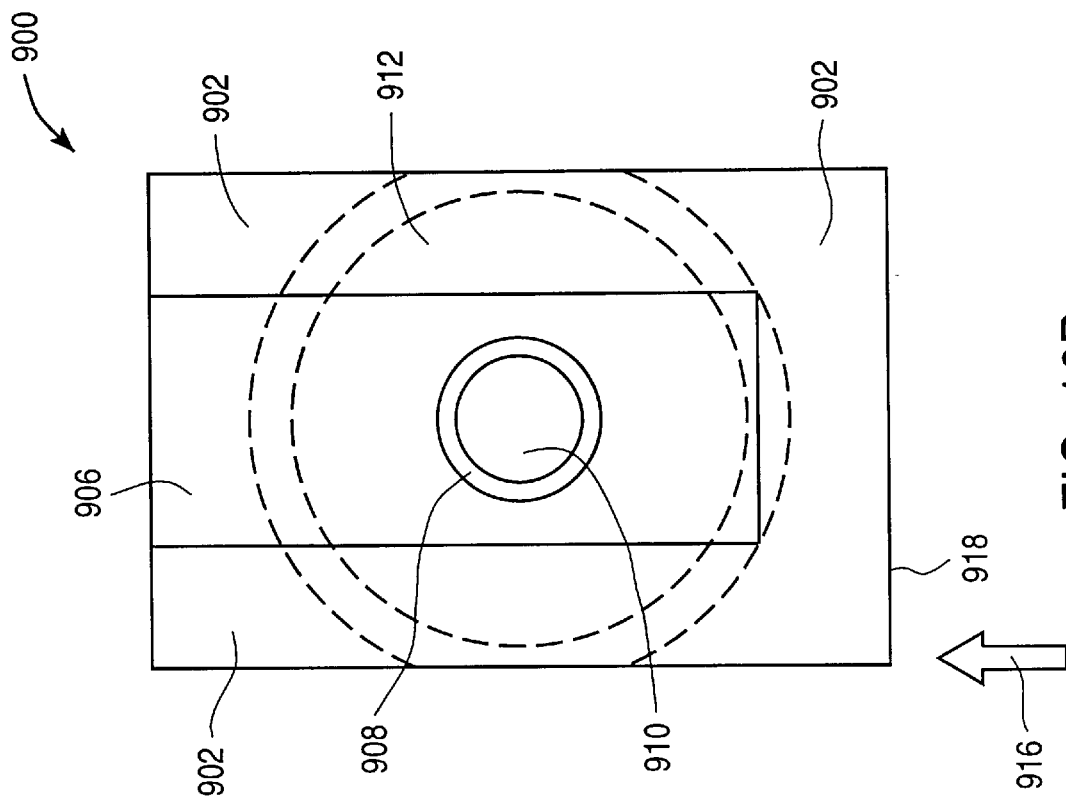
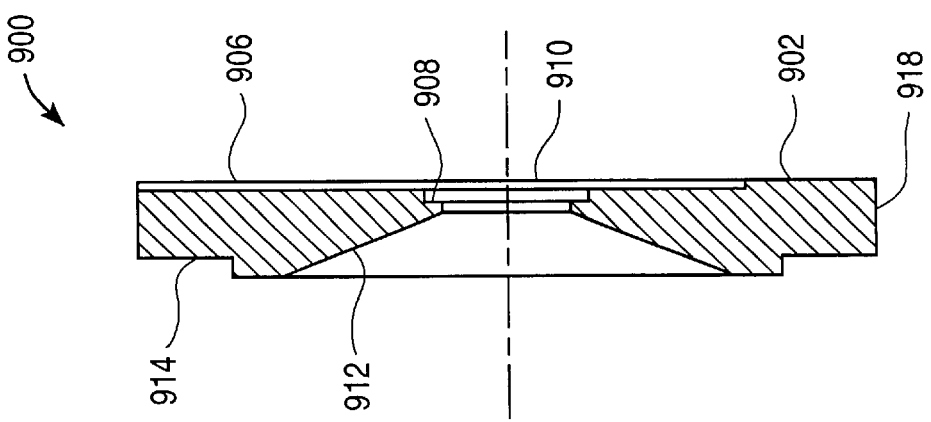
FIG. 10A
FIG. 10B

LOAD AND UNLOAD CONTROL FOR MAGNETO-OPTICAL DISK DRIVE

RELATED APPLICATIONS

The present application is a continuation-in-part of U.S. patent application Ser. No. 09/026,798 filed Feb. 20, 1998 now U.S. Pat. No. 6,104,675 and is also related to co-pending U.S. patent application Ser. No. 09/027,420 filed Feb. 20, 1998 and Ser. No. 09/148,765 filed Sep. 4, 1998, all of which are assigned to the assignee of the present application.

FIELD OF THE INVENTION

The present invention relates to the field of disk drive mechanisms for reading data from and writing data to data storage disks. More particularly, the present invention relates to the field of magneto-optical (MO) disk drives.

BACKGROUND OF THE INVENTION

Electronic data is commonly stored on disks of various types. Disk drives hold and rotate the disk while positioning a mechanism over the disk to read data from it or write data to it. Some conventional disk drives use a "flying" read/write head, or "flying head", to access data stored magnetically on circular or spiral grooves, or tracks, of the data storage disk. Engaging the flying head in a position to access data is referred to as loading the head.

Typically, the flying head is positioned over a track at a certain height to allow data reading or data writing. For example, in magneto-optical (MO) disk drives, data is recorded by positioning a head that includes a magnetic coil in proximity to an MO disk, locally heating the MO disk to lower the coercivity of a layer of magnetic media. When the coercivity of the magnetic media is lowered, the magnetic head applies a magnetic field to reverse the magnetic polarity in the heated area recording data on the MO disk. In such MO disk drives, data is read from the magnetic media of the MO disk by illuminating areas of the MO disk with linearly polarized laser light. The Kerr rotation effect causes the plane of polarization of the illuminating laser beam to be rotated. The direction of rotation depends on the magnetic polarity in the illuminated area of the storage media.

To read data from a MO disk the polarization rotation is determined with a pair of optical detectors in a polarization beam splitter to produce an output data signal.

In one prior art method a flying head is initially loaded onto the surface of a stationary MO disk (i.e., not spinning) and no data access operation is taking place. To access data, the MO disk is rotated such that a thin film of air forms between the MO disk and the flying head. The surface of the flying head that is just above the disk surface is known as the air-bearing surface of the head. When the flying head is suspended above the MO disk in this manner, it can be moved over a desired concentric track of the MO disk to access data stored on that track. This technique is referred to as static loading and unloading (also known as contact start-stop, i.e., CSS). Normally, the MO disk must be stationary when the head is loaded or unloaded.

The aforementioned technique has several disadvantages. First, a section of the disk area must be reserved as a "landing zone", which reduces the area available for data storage. Secondly, a head can crash into the surface of the MO disk under certain conditions. For example, head crash can occur whenever the drive is suddenly bumped or dropped, power is cut off from the drive, a contaminant particle gets trapped under the air-bearing surface of the head, etc. When a head crash occurs, damage to the MO disk is likely, as well as a loss of data, and possibly even catastrophic destruction of the drive itself.

Another disadvantage of static loading/unloading systems is the requirement of extremely smooth, flat, slider and media surfaces. In other words, the integrity of the head/disk interface is of paramount importance in a system that performs static loading/unloading. Moreover, these very smooth, flat surfaces must be maintained over the lifetime of the drive, which ordinarily includes thousands of CSS events. In addition, there is a need to maintain an adequate amount of lubrication on the media surface.

Another past approach involves dynamically loading and unloading the head while the MO disk is spinning. FIG. 1 is a top view of a portion of a disk drive that includes apparatus for dynamic loading and unloading of a magnetic head. A rotatably mounted actuator arm 103 is attached to a suspension 106. A slider body or head 109 is typically mounted via a gimbal to the distal end of suspension 106. It is appreciated that the suspension assembly may be manufactured of a single piece of formed material. Most often, suspension 106 incorporates a bend 105, which imparts a spring force and stiffness to the suspension in a direction perpendicular to the planar surface of MO disk 107. Some suspensions include multiple bends for this same purpose.

The angle of bend 105 required to produce the appropriate spring rate and other characteristics required for a particular disk drive is ordinarily calculated before forming suspension 103. Because the forming process is imprecise, some trial and error adjustment usually is required to produce a suspension assembly having the correct mechanical characteristics (e.g., flying height, stiffness, pitch and roll, etc.). Head 109 is loaded onto the disk surface by sliding a rigid extended tip section 128 down a fixed ramp 101 in a direction shown by arrow 102. Ramp 101 is appropriately sloped so that as the head moves over disk 107, it begins flying at a height (above the disk surface) that is proper for write operations.

FIG. 2 is a side view of the suspension assembly of FIG. 1 (not to scale) showing head 109 attached to the distal end of suspension 106. Bend 105 is located at the proximate end of the suspension, near to a mounting plate 111. Well-known ball swaging techniques are normally used to attach mounting plate to a mounting area 113 of actuator arm 103. Note that when head 109 is loaded onto disk 107 suspension 106 flexes so that the bottom, air-bearing surface 115 of head 109 is just above, and approximately parallel to, the planar surface of disk 107.

The major disadvantage of this type of suspension system is the time and expense required to precisely form a correct bend angle at the end of suspension 106. It is also very time-consuming to test the suspension to confirm that it has the appropriate spring force and other mechanical characteristics.

SUMMARY OF THE INVENTION

The present invention provides an apparatus for reading/writing data from/to a magnetic disk. In one embodiment, the apparatus comprises an objective lens disposed in an actuator body. The objective lens focuses laser light onto the magnetic disk. A magnetic head suspension assembly that includes a magnetic recording head is attached to the actuator body. The magnetic head suspension assembly further includes a suspension arm having a proximate end fixedly attached to the actuator body, a distal end with a tab, and a gimbal located between the distal and proximate ends. The magnetic recording head is attached to the gimbal.

The apparatus further comprises a mechanism having an extending member moveable in a first direction to engage and move the tab until the magnetic recording head is placed in an unloaded position away from the magnetic disk. The extending member is also moveable in a second direction to release the tab such that the magnetic recording head is placed in a loaded position in close proximity to the magnetic disk for writing operations.

BRIEF DESCRIPTION OF THE DRAWINGS

The present invention will be understood more fully from the detailed which follows and from the accompanying drawings, which however, should not be taken to limit the invention to the specific embodiments shown, but are for explanation and understanding only.

FIG. 9 is a perspective view of a load/unload mechanism utilized in accordance with one embodiment of the present invention.

FIG. 10A is cross-sectional side view of a slider utilized in accordance with one embodiment of the present invention.

FIG. 10B is a bottom view of the slider of FIG. 10A.

DETAILED DESCRIPTION

A magneto-optical (MO) disk drive for reading/writing data from/to a magneto-optical MO disk is described. In the following description numerous specific details are set forth, such as dimensions, material types, configurations, etc., in order to provide a thorough understanding of the present invention. However, persons having ordinary skill in the magnetic recording arts will appreciate that many of these specific details may not be needed to practice the present invention.

Figure 1:
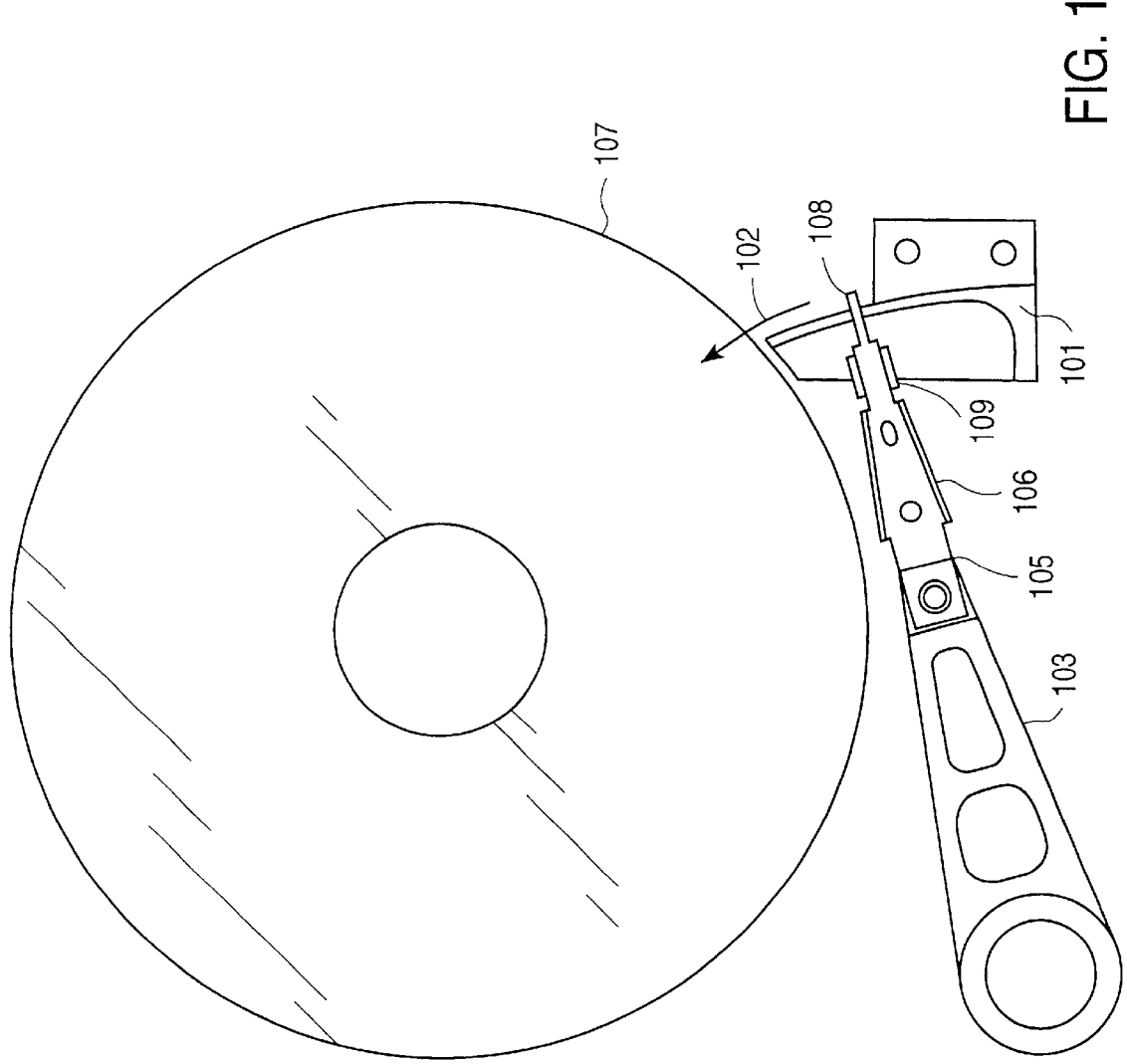
FIG. 1 is a top view of a portion of a prior art disk drive.
Figure 2:
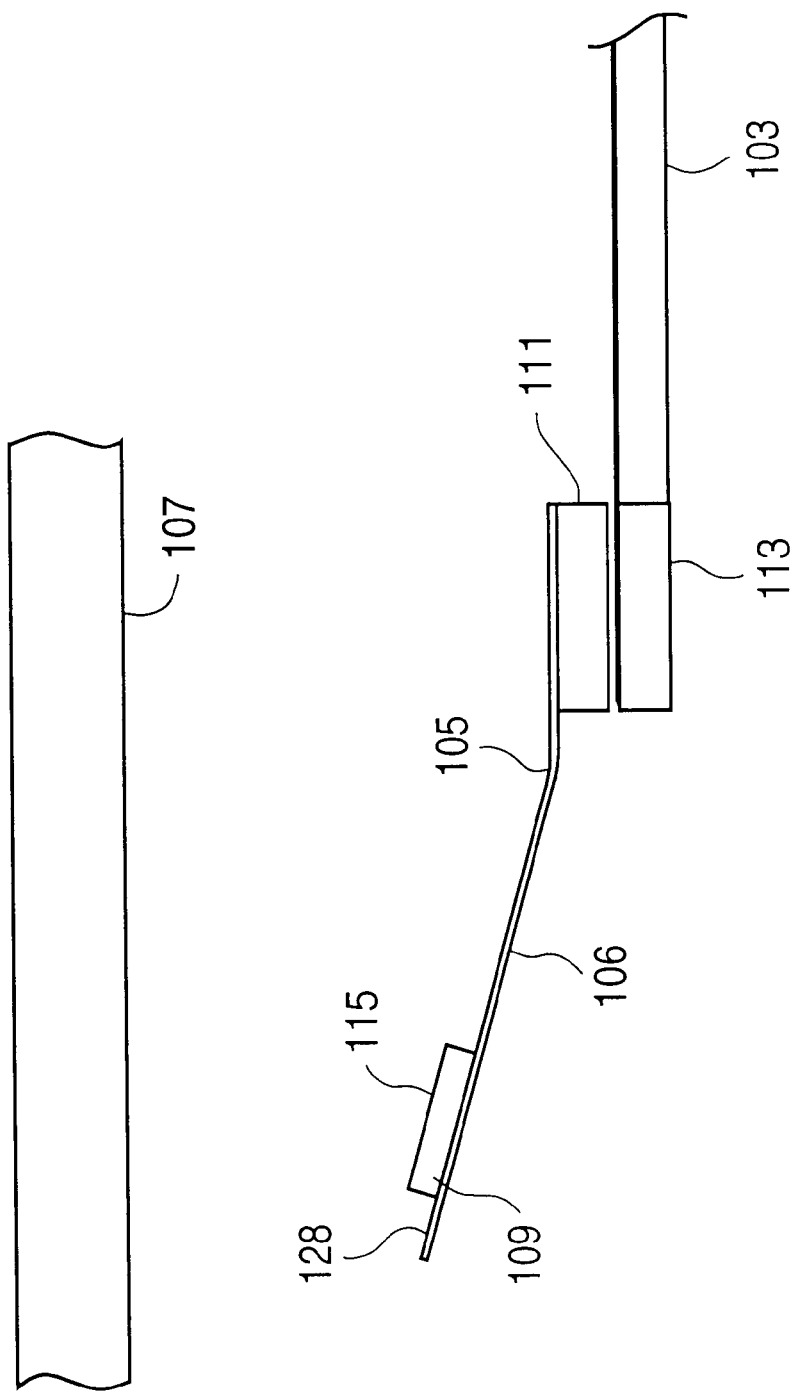
FIG. 2 is a side view of the suspension shown in FIG. 1.
Figure 3:
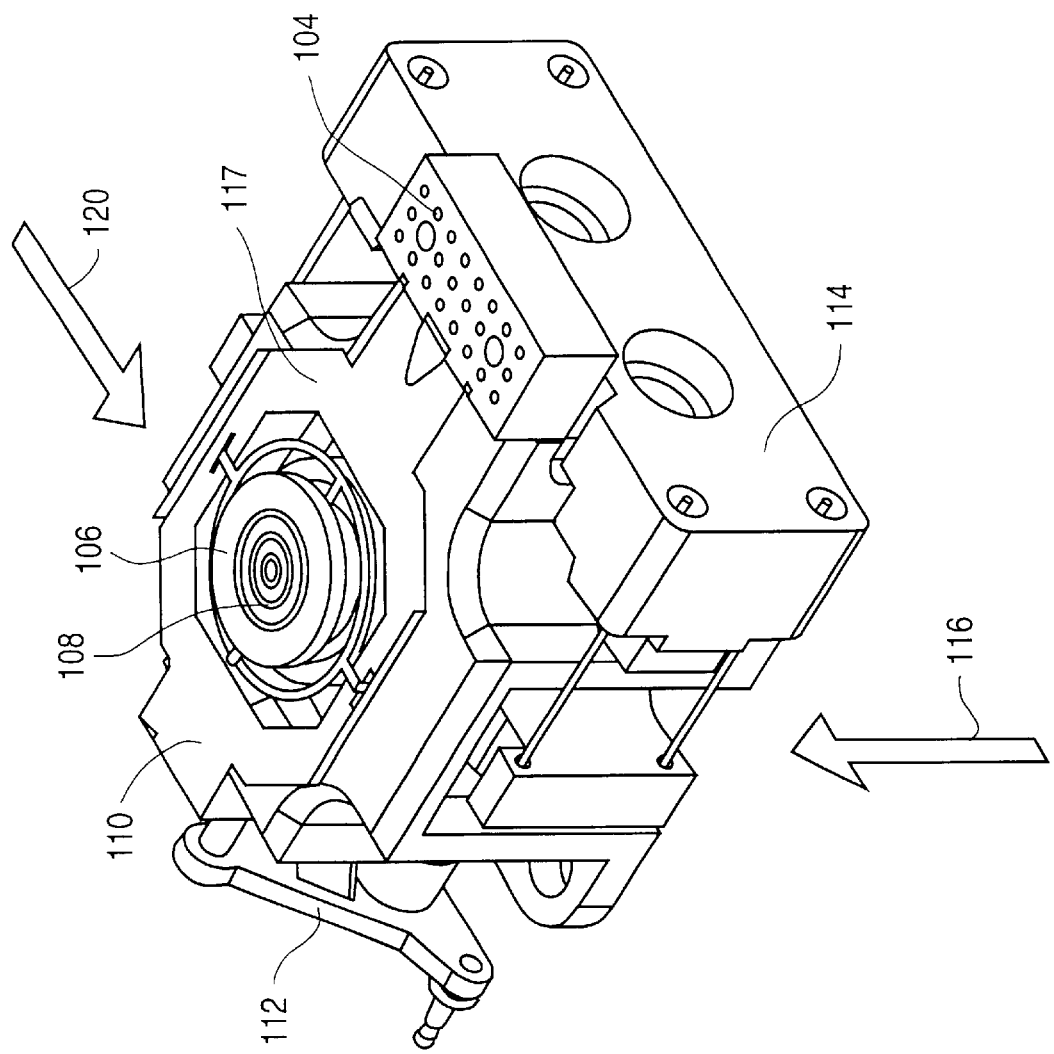
FIG. 3 is a perspective view of one embodiment of the apparatus of the present invention.

In accordance with one embodiment of the present invention, FIG. 3 illustrates an apparatus, which includes an actuator body 114 having an attached magnetic head suspension assembly 110. In the described embodiment, reading and writing of information to the recording disk is performed magneto-optically utilizing the apparatus of FIG. 3. It should be understood, however, that the present invention could also be used advantageously in systems employing other recording technologies.

Actuator body 114 houses a fine actuator, a focus actuator and an objective lens (all disposed within the interior of body 114). The objective lens focuses a beam of laser light aimed in a longitudinal direction, as indicated by arrow 116, onto a spot of the MO disk (not shown). Focusing the beam of laser light onto the disk is required for both read and write operations of the disk drive. The focus actuator moves the objective lens up and down along a longitudinal axis (i.e., direction 116) to maintain focus of the light beam spot. Conversely, the fine actuator moves the objective lens in a lateral direction (i.e., side-to-side), as indicated by arrow 120, to maintain fine positioning of the light beam on a selected track. For coarse positioning, actuator body 114 is attached to a movable carriage of the drive assembly.

Head suspension assembly 110 supports a magnetic recording head comprising a slider 106 and a magnetic coil 108, both of which face the MO disk surface in the completely assembled disk drive. Head suspension assembly 110 includes a suspension arm 117 and a mounting plate 104, which is attached to actuator body 114 using any one of a number of well-known methods (such as bonding, screw mounting, swaging, etc.). Optionally, mounting plate 104 can include clips 126 disposed at opposite ends to provide a snap attachment of head suspension assembly 110 onto actuator body 114. Ideally, clips 126 are formed so as to hold assembly 110 in position on actuator body 114 by spring tension.

Suspension arm 117 is made of a strong, yet flexible material such as stainless steel or copper, which allows the slider to adequately pitch and roll over the disk surface. Longitudinal movement of the distal end of suspension arm 117 (opposite mounting plate 104) may be controlled by a load/unload mechanism 112. As explained in more detail below, load/unload mechanism 112 operates to move suspension arm 117 in a longitudinal direction away from the disk to unload the slider 106 from the disk surface. When the distal end of arm 117 is released by mechanism 112, the spring force of the suspension loads the head assembly, which includes slider 106, back down to a flying height in close proximity to the disk surface (i.e., a loaded position).

In operation, the MO disk rotates in a plane parallel to the surface of slider 106. As explained previously, the combination of the rotational movement of the disk and the load force provided by the suspension causes slider 106 to "fly" over the disk surface on a thin film of air. In this manner, ordinary servo control circuitry governing the movement of actuator body 114 may be utilized to laterally position to the objective lens and slider 106 over a selected track of the MO disk.

As discussed above, when suspension arm 117 is released by load/unload mechanism 112, slider 106 is in a loaded position with respect to the MO disk. In the embodiment of FIG. 3, magnetic coil 108 forms a light channel through which laser light passes to the MO disk. Actuator body 114 includes a fine actuator for fine tracking and a focus actuator for focusing laser light through the objective lens. The fine actuator moves radially (laterally as shown in FIG. 3) with respect to the MO disk, while the focus actuator moves perpendicularly (longitudinally as shown in FIG. 3) with respect to the MO disk. It should be understood that although the objective lens is attached to and controlled by both the fine actuator and focus actuator in actuator body 114, it is de-coupled from the magnetic recording head attached to suspension 110.

Figure 4:
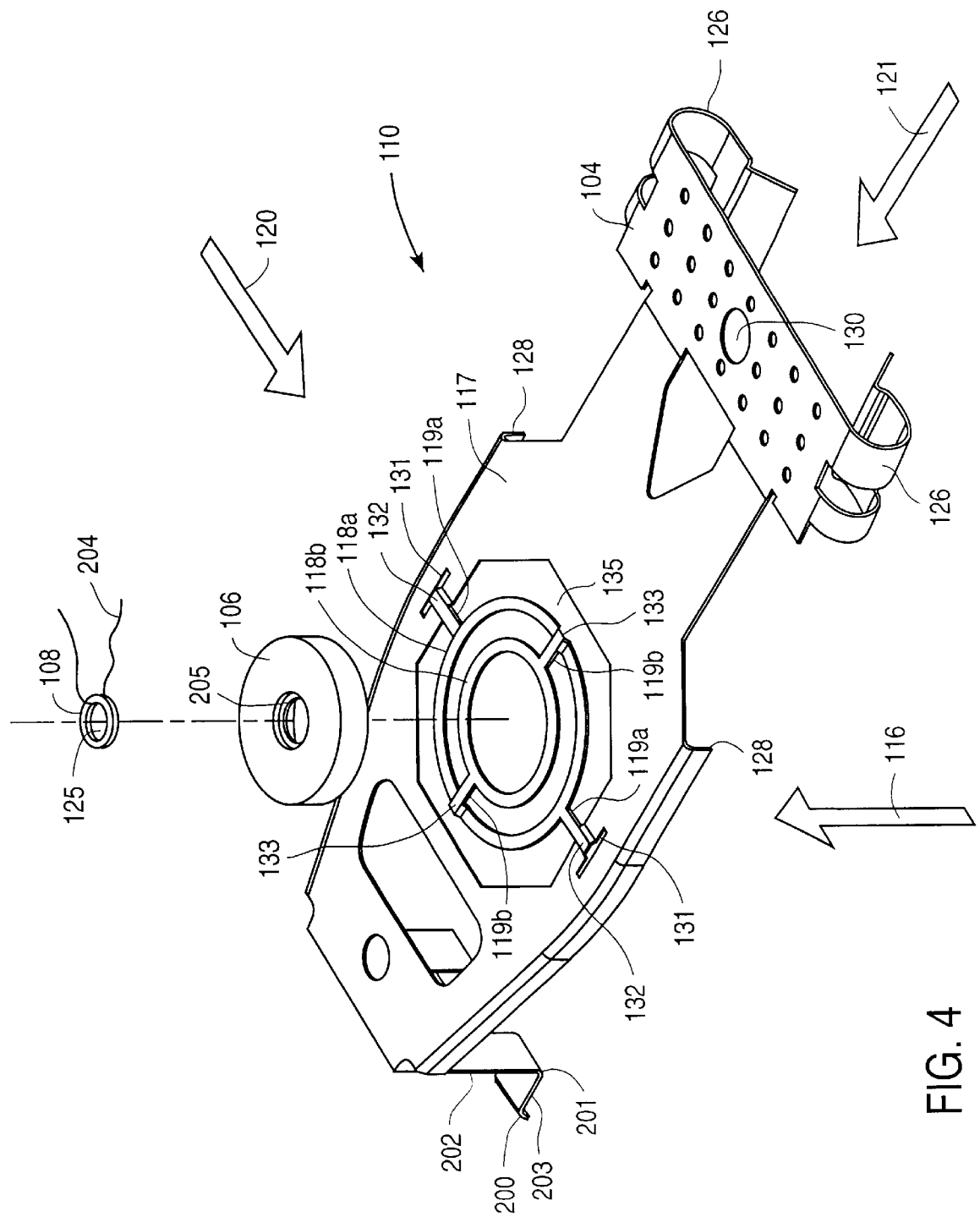
FIG. 4 is a perspective view (topside) illustrating the head suspension assembly of FIG. 3.

FIG. 4 is an exploded view of one embodiment of the head suspension assembly 110 of the present invention. Head suspension assembly 110 comprises mounting plate 104, suspension arm 117, a gimbal 118, and a tab 201. Each of these elements may be fabricated from a single, integral piece of material, e.g., stainless steel. Tab 201 is attached to the distal end of suspension arm 117 and comprises a section 202 that extends downward in a direction perpendicular to the general primary planar surface of suspension arm 117. Tab 201 also comprises a flange 203 that joins section 202 at approximately a right angle. In the illustrated embodiment, flange 203 includes a bent edge 200 that imparts additional stiffness to flange 203. (Note that the exact bend angle of tab 201 is not considered critical to the present invention.)

The purpose of flange 203 is to provide a rigid contact element for the load/unload mechanism 112. In operation, load/unload mechanism 112 forcibly engages flange 203 to move suspension arm 117 in a direction so as to unload the magnetic head. An extending element of mechanism 112 pulls flange 203 downward in a longitudinal direction such that slider 106 (attached to gimbal 118) is pulled away from the surface of the MO disk. Practitioners in the art will appreciate that tab 201 may be configured in a variety of shapes and sizes to achieve its purpose, and that the embodiment of FIG. 4 simply represents one possible implementation.

Gimbal 118 comprises an outer gimbal section and an inner gimbal section supported within a cutout area 135 of suspension arm 117. The outer section is made up of an annular ring 118a joined to suspension arm 117 by a pair of laterally opposed outer tabs 119a along an axis lying in the direction of arrow 120. Notice that outer tabs 119a are formed so that annular ring 118a is slightly elevated above the primary planar surface of arm 117. This feature is produced by the inclusion of raised tiers 132 at the points where outer tabs 119a attach to suspension arm 117. Tiers 132 elevate annular ring 118a above the primary planar surface of arm 117. Press fit bending of the material adjacent slots 131 is one way of producing tiers 132.

The inner section comprises an annular ring 118b joined to annular ring 118a by a pair of opposed inner tabs 119b arranged along a transverse axis lying in a direction indicated by arrow 121. (Note that the transverse, lateral, and longitudinal directions are each orthogonal to one other.) Inner tabs 119b are also joined to annular ring 118a by tiers 133, which elevate annular ring 118b slightly above the plane of annular ring 118a. Tiers 133 may be formed in the same manner as tiers 132. Thus, gimbal 118 comprises a two-tiered structure that elevates the attached magnetic head assembly above the primary planar surface of suspension arm 117, and thereby positions slider 106 closer to the disk surface of the drive.

Furthermore, in the described configuration the two concentric annular rings 118a and 118b pivot each about an axis that is parallel to the surface of the disk. The flexibility of tabs 119 thus permits the head suspension assembly to pitch and roll over the disk surface.

In the embodiment of FIG. 4, annular rings 118 are shown as being circular, with the pivot axes of the inner and outer gimbal sections perpendicular to each other. However, it is appreciated that the gimbal could be implemented in a variety of different ways with the individual elements having other shapes, e.g., rectilinear, elliptical, etc.

Slider 106 is attached to inner annular ring 118b using conventional methods, such as gluing, bonding, etc. In one embodiment, slider 106 includes an outer circumferential notch 122 that is sized to accept annular ring 118b. That is, slider 106 is fabricated so that annular ring 118b fits within notch 122, thus making slider body 106 and gimbal assembly 118 self-aligning. This aspect of the present invention is illustrated in FIG. 12, which is a side view showing the arrangement of slider 106, inner annular ring 118b and magnetic coil 108. So configured, the assembly process is made easier and more efficient as compared to prior art methods. It also achieves a tighter, stronger bond of slider 106 to gimbal 118.

Similarly, magnetic coil 108 may be attached (e.g., bonded) to slider 106 in a self-aligned manner by fabricating slider 106 to have an inner circumferential notch 205 that is sized to accept annular magnetic coil 108. Once again, this is shown in the side view of FIG. 12. An advantageous benefit of self-aligned attachment of the coil, slider, and gimbal is the aligned matching of the x and y axes of the gimbal and suspension assemblies to those of the magnetic head assembly.

In the illustrated embodiment an opening 125 in the center of magnetic coil 108 defines a channel for laser light beam to pass through. By way of example, the diameter of opening 125 may be approximately 0.120 mm. Magnetic coil 108 is also shown comprising a wire 204 that is wrapped about an ordinary core material. For example, in one embodiment wire 204 is wrapped with approximately 25 turns of copper or aluminum wire to give coil 108 has a relatively fast current rise time of less than three nanoseconds.

Additionally, suspension arm 117 may include bent edge members 128 to add stiffness to the arm along the transverse direction. Note that in FIG. 5, gimbal 118 and the attached magnetic head assembly lie in a plane which is just below the primary planar surface of arm 117. As discussed previously, this planar offset results from the formation of tiers (as per the view of FIG. 4) at the slotted attach points 131.

Figure 5:
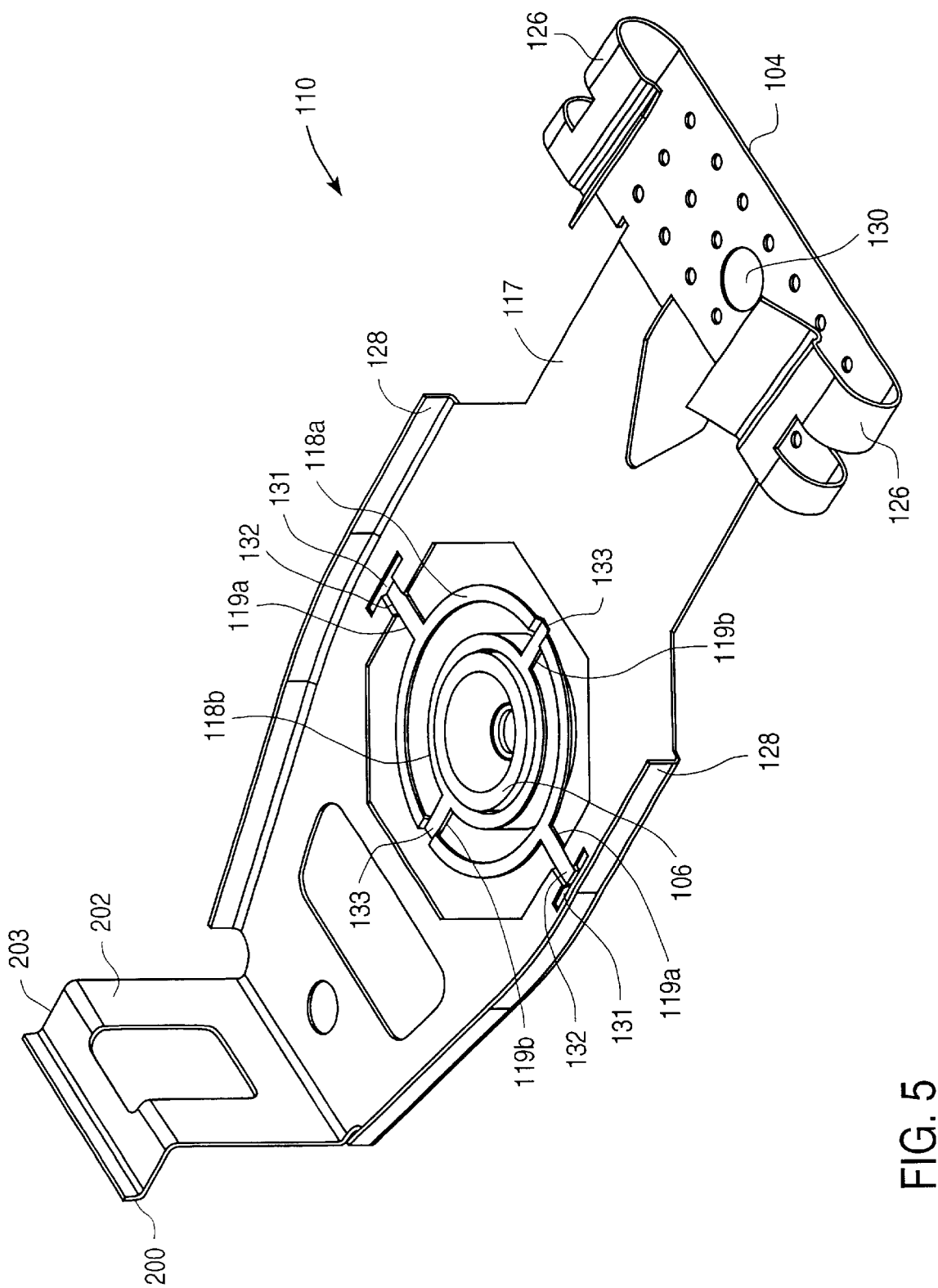
FIG. 5 is a perspective view (bottom-side) illustrating the head suspension assembly of FIG. 3.

FIG. 5 is a bottom view of head suspension assembly 110, showing the side of suspension assembly 110 that faces away from the MO disk in the drive.

Figure 6:
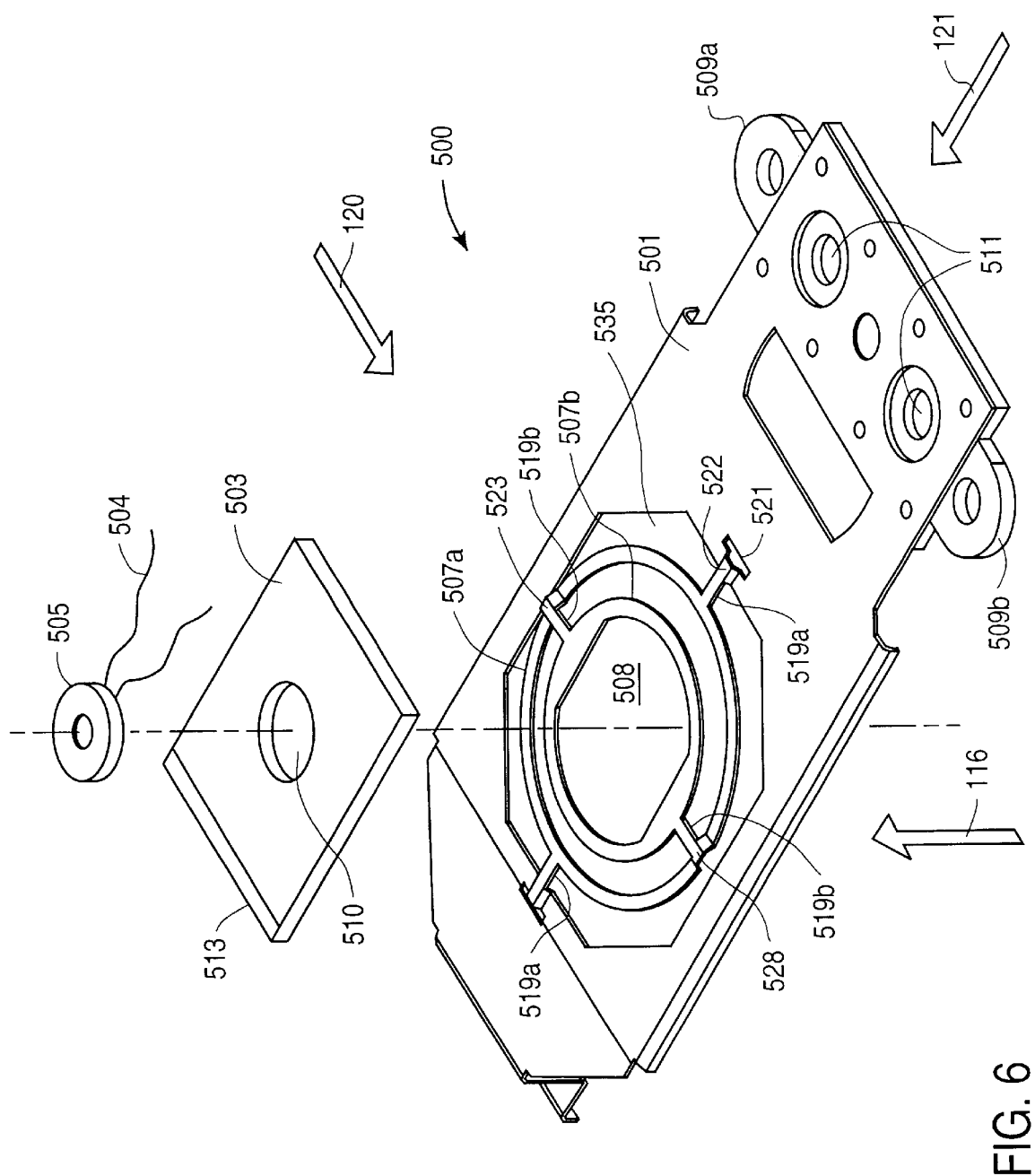
FIG. 6 is an exploded perspective view of another embodiment of a head suspension assembly, including a magnetic head assembly, in accordance with the present invention.

FIG. 6 is a diagram of another embodiment of a head suspension assembly of the present invention. Head suspension assembly 500 comprises a suspension arm 501, and a gimbal 507 that includes annular rings 507a & 507b. Annular ring 507b has an opening 508 that accommodates a rectilinear shaped slider 503. Slider 503 includes a leading edge chamfer or bevel 513 to help create an air bearing when slider 503 is brought into close proximity with the spinning disk. Slider 503 also includes an opening 510 to accommodate magnetic coil 505 (shown with attached wires 504) so that it sits flush with the bottom surface of slider 503. As before, opening 510 of the slider may optionally include a notched inner circumferential edge to seat coil 505. Head suspension assembly 500 may be attached to the actuator of the disk drive through conventional methods, such as riveting, ball swaging, or screw/bolt attachment via recessed holes 511.

In FIG. 6, the mounting portion of the assembly is shown optionally including extended members 509a & 509b, which may be used to align suspension 501 with the disk drive so that laser light may travel through the opening in coil 505 as required during read and write operations.

As was the case in the previous embodiment, the gimbal of FIG. 6 comprises an outer gimbal section and an inner gimbal section supported within a central opening 535 of suspension arm 501. The outer section includes an annular ring 507a supported by a pair of opposed outer tabs 519a— disposed along the transverse direction of arrow 121. Outer tabs 119a are formed with raised tiers 522 adjacent slots 521 to elevate annular ring 507a slightly above the primary planar surface of arm 501.

The inner section comprises an annular ring 507b attached to annular ring 507a by a pair of opposed inner tabs 519b arranged along a lateral axis lying in a direction indicated by arrow 120. Inner tabs 119b are attached to annular ring 507a via tiers 523, which elevate annular ring 507b slightly above annular ring 507a, thus achieving a two-tiered structure. The gimbal shown in FIG. 6 permits the head suspension assembly to pitch and roll over the disk surface in the same manner described above with respect to FIGS. 4 & 5.

Figure 7A:
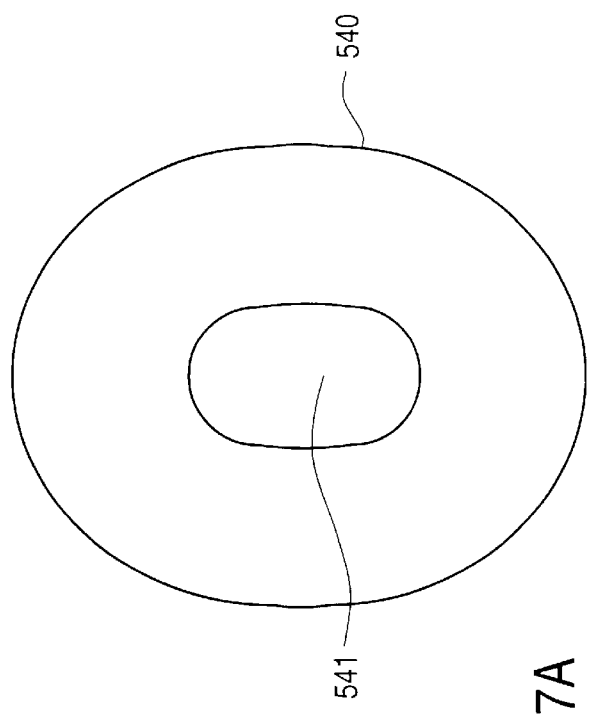
FIG. 7A is a top view of a magnetic write coil utilized in one embodiment of the present invention.
Figure 7B:
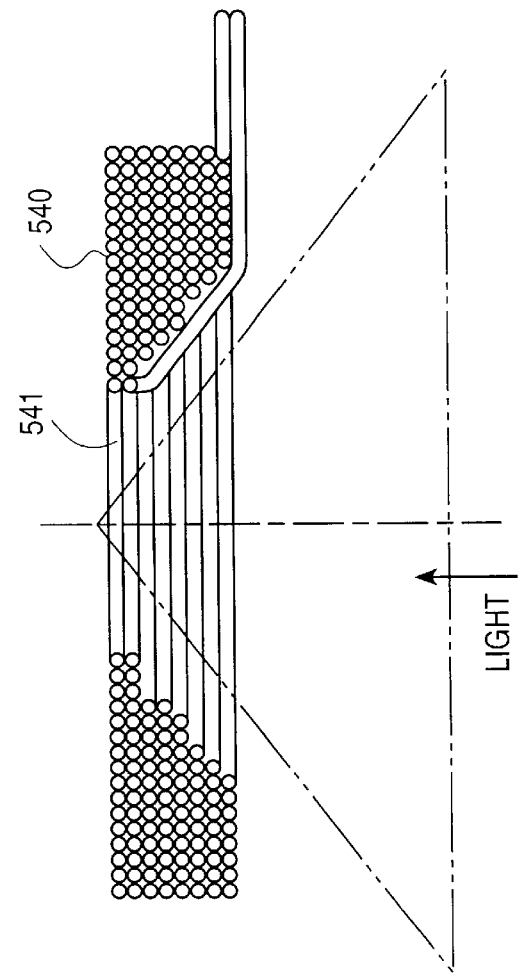
FIG. 7B is a cross-sectional side view of the magnetic write coil of FIG. 7A.

FIG. 7A is a top view of an alternative embodiment of a magnetic coil 540 that may be used in conjunction with the head assemblies discussed above. The oval shape of magnetic coil 540 beneficially results in lower inductance. A cross-sectional side view of magnetic coil 507 is shown in FIG. 7B. Note that coil 540 is wound to create a conical shaped central opening 541. Laser light enters magnetic coil 540 through the wider, bottom side of opening 541. As electric current travels through magnetic coil 540, magnetic flux is induced in the center of magnetic coil 540 in a direction that is perpendicular to the surface of the MO disk. Due to the conical cross-section of opening 541, the windings of coil 540 are positioned closer to the focal point of the laser light than in prior art systems. The conical shaped opening 541 therefore increases the amount of flux produced per the amount of inductance (or the amount of clearance between the laser light and the magnetic coil). In an exemplary implementation, the wire of coil 540 is 56-gauge wire and the wire has 25 turns.

Figure 8B:
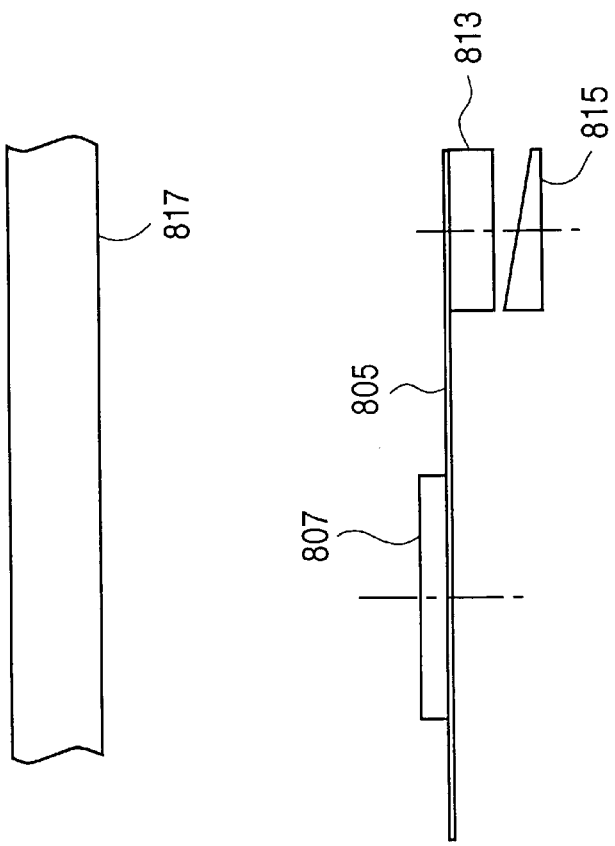
FIG. 8B is a conceptual side view of an alternative embodiment of a head suspension assembly in accordance with the present invention.
Figure 8A:
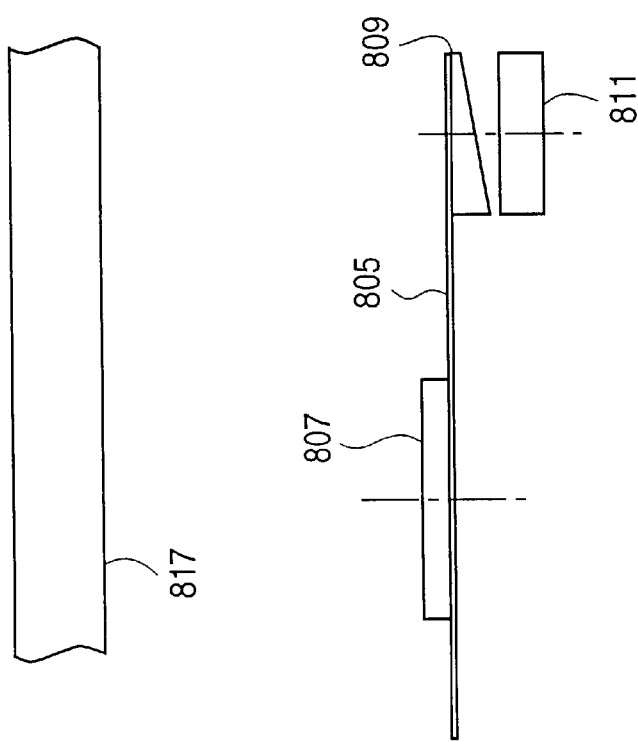
FIG. 8A is a conceptual side view of one embodiment of a head suspension assembly in accordance with the present invention.

FIGS. 8A & 8B are diagrams of alternative embodiments of the head suspension assembly of the present invention. Each comprises a suspension arm 805 made from a single, integral flat piece of material, e.g., stainless steel, with an attached magnetic head assembly 807. The head assembly may comprise any of head assembly embodiments described above. When assembled in a disk drive, a beveled mounting plate 809 (FIG. 8A) is attached to a mounting area 811 of the disk drive so that the mating surfaces of mounting plate 809 and mounting area 811 are held fixedly together. When assembled in this way, suspension arm 805 is attached at an angle (equal to the angle of the bevel) with respect to the surface 817 of the MO disk. In this manner, a gram load for the head suspension assembly is determined. In other words, the present invention is able to generate a gram load without bending or pre-forming the suspension arm. This also obviates the need to exhaustively test the suspension for proper spring force and other mechanical properties.

The bevel angle of mounting plate 809 may be calculated from the required spring force. For example, computer programs that perform finite element analysis may be utilized to determine the correct bevel angle. So determined, the spring force or stiffness in the direction toward the disk surface is ensured to be consistently accurate. This is a marked improvement over prior art techniques, where even after bend locations and angles for the suspension are determined and tested, further process verification testing is still required due to variances introduced by the forming process and composition of the material.

FIG. 8B illustrates that the bevel angle may alternatively be formed in the mounting area 815 (e.g., the area of attachment to the actuator) rather than in the mounting plate 813 associated with suspension arm 805.

FIG. 9 illustrates one possible implementation of load/unload mechanism 112, with suspension arm 117 being shown in a loaded position. Load/unload mechanism 112 is mounted on the side of actuator body 114 near the distal end of suspension arm 117. Load/unload mechanism 112 comprises an engagement arm 604 having a pin member 603 at one end that extends over flange 203 of tab 201. A microprocessor or other circuitry in the disk drive controls the operation of load/unload mechanism 112.

During loading and unloading operations, engagement arm 604 rotates about a stationary axial pin 612. For example, during an unloading operation engagement arm 604 rotates in a direction (either clockwise or counterclockwise) such that pin member 603 moves downward to contact flange 203. Continued rotation causes pin member 603 to push contact flange 203 downward, thereby lifting suspension arm 117 (and the attached magnetic head assembly) away from the disk.

From the unloaded position, rotational movement of engagement arm 604 in an opposite direction causes pin member 603 to move upward. Flange 203 moves upward with pin member 603 to progressively move the magnetic head assembly closer to the disk. Eventually, continued rotation in the opposite direction causes pin member 603 to release from flange 203. At this point, the spring force of the suspension arm acts to position the slider at a predetermined flying height above the surface of the spinning disk. That is, when pin member 603 is not in contact with flange 203, the magnetic head assembly is free to fly above the MO disk at a height appropriate for read/write operations.

The load/unload mechanism of FIG. 9 further includes a cylindrically shaped anchor pin 608, a cam 602, and a moving pin 606. Moving pin 606 passes through an opening 607 in cam 602. Stationary pin 612 is fixedly attached to the flat side surface of cam 602. Similarly, anchor pin 608 is fixedly attached to the adjoining side of actuator body 114. The smoothly curved edge surface of cam 602 contacts the cylindrical body of anchor pin 608. Anchor pin 608 and moving pin 606 are connected by spring 614.

To load or unload the magnetic head assembly, torque is applied to cam 602 sufficient to overcome the retaining force provided by spring 614. When this happens, cam 602 (along with engagement arm 604 and moving pin 506) rotates. During rotation, spring 614 ideally provides enough force to maintain contact between the cylindrical body of pin 608 and the edge surface of cam 602. To facilitate rotation, the cylindrical body of pin 608 may be rotatably attached to actuator body 114.

In the loaded position, the retaining force supplied by spring 614 is sufficient (absent an applied torque to cam 602) to maintain load/unload mechanism 112 in the position shown. The contacting surface of cam 602 may also be flattened, or otherwise shaped to facilitate retention of the loaded position. To once again load the head, cam 602 is rotated (e.g., clockwise) to overcome the retaining force of spring 614 is overcome. In the unloaded position, the spring force of spring 614 holds the mechanism in position. Since spring force is used to maintain load/unload mechanism 112 in both the loaded or unloaded positions, the use of electrical energy is unnecessary.

In the illustrated embodiment, load/unload mechanism 112 is actuated by a rotary moving coil and fixed magnet actuator (not shown). However, it is appreciated that mechanism 112 may comprise a wide variety of mechanical and/or electro-mechanical assemblies that fulfill the purpose of engaging and moving tab 201 in two directions.

The present invention provides a significant advantage over prior art approaches since the magnetic head assembly can be loaded or unloaded at any radial position of a disk. In addition, processor control of the load/unload mechanism permits automatic unloading of the flying magnetic head—regardless of position on the disk—under a fault condition, e.g., a sudden loss of power, presence of a contaminant on the disk surface, etc. For instance, in the event of a sudden interruption of power to the drive, capacitively stored power may be applied to unload the flying magnetic head. Alternatively, the back electromagnetic force (EMF) of the spindle motor turning the disk may be used to unload the head before the disk stops spinning. Thus, the danger of the magnetic head physically crashing into the disk is virtually eliminated by the present invention.

The present invention also obviates the need to dedicate an area of the disk as a landing zone. This means that the entire disk surface is available for data storage, thereby increasing the overall data storage density over the prior art. Additionally, the requirement of adequate disk lubrication to accommodate repeated contact-start-stop events is likewise alleviated.

Another important benefit achieved by the present invention is the decoupling of the objective lens from the flying magnetic head. Because the magnetic head is used only for writing, the present invention makes it possible to scan the disk using only the objective lens, without loading the magnetic head. This has the advantage of allowing a scan of pre-embossed information before loading the head. Practitioners in the art will appreciate that scanning the disk without having the head assembly loaded eliminates the possibility of a head crash in situations where the disk is of an incorrect type, or is contaminated. A scan of pre-embossed information can often provide an indication of such problems, thus preventing loading of the magnetic head under potentially hazardous conditions.

Figure 11:
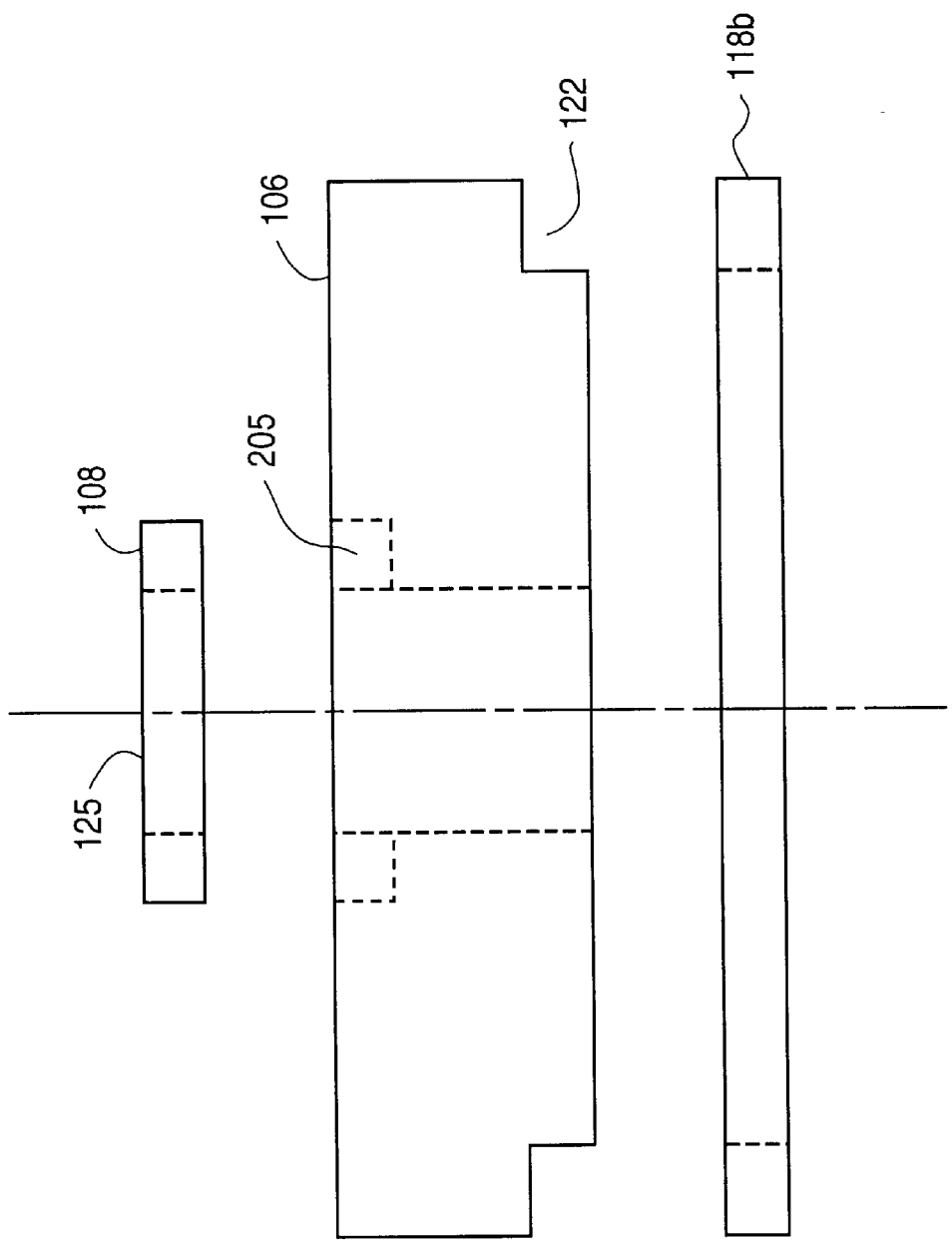
FIG. 11 is an exploded side view of a magnetic head assembly utilized in accordance with one embodiment of the present invention.

FIG. 11A is a cross-sectional side view of a slider 900 that is suitable for use in the head suspension assembly of the present invention. FIG. 11B is a bottom view (from primary surface 909) of slider 900. As can be seen, a seat 908 is included to accommodate bonding of a magnetic coil. The magnetic coil sits coplanar with air bearing surface 802. A circumferential shelf 914 is included on the backside of the slider body, along with a conical cutout section 912. Shelf 914 is sized to accept the inner annular ring of the gimbal (e.g., shown in FIGS. 4 & 5). Cutout section 912 directs the light beam through opening 910, which provides a light channel through slider 900.

Slider body 900 further includes a raised positive pressure air-bearing surface 902 around three of the peripheral side areas of the slider body. A recessed area 906 relieves pressure in the central and trailing edge portions of the slider. Airflow is shown in the direction indicated by arrow 916. As air strikes leading edge 918, loose surface contaminants are knocked off of the MO disk before they can pass or become trapped under slider 900. This is achieved by the elimination of a leading edge ramp, which is obviated in the present invention because the slider never contacts the disk. This is true even when the head is unloaded and the disk stops spinning. Prior art drives typically include a beveled leading edge to assist in "takeoff" of the slider from the surface of the disk.

It should be understood that various slider body configurations may be used in different embodiments depending, for example, on the stability and stiffness required of the flying head in operation. Other concerns that contribute to the choice of a particular design relate to tribology, in that certain designs may knock off or trap contaminants differently. In addition, a slider body design may be chosen based on the desired flying height of the magnetic head assembly. For example, a greater flying height usually requires greater surface area for the slider body. Also a greater flying height may require greater area for a magnetic coil because the magnetic force required for operation is greater at greater distances from the magnetic medium. In drives in which miniaturization is a major concern, a low flying height and, consequently, a small slider body may be appropriate.

We claim:

1. A method of operation in a disk drive, comprising:
   spinning a magnetic disk;
   preliminarily reading the magnetic disk of the disk drive with a magnetic head in an unloaded position to determine that the magnetic disk is in a writeable condition;
   releasing a contact force applied to a distal end of the suspension arm to allow a spring force to move the magnetic head to a loaded position in close proximity to the disk, a proximate end of the suspension arm being fixedly attached to a support member with the magnetic head being attached to the suspension arm at a location between the distal and proximate ends; and
   writing to a radial track of the magnetic disk with the magnetic recording head in the loaded position.

2. The method of claim 1, wherein the reading step comprises:
   reading pre-embossed information from the magnetic disk, the pre-embossed information including disk type and data capacity.

3. The method of claim 1, wherein the spring force is produced by a bevel angle formed in either a mounting area of the support member where the proximate end of the suspension arm attaches, or in a mounting plate associated with the suspension arm.

4. The method of claim 1 further comprising the step of:
   moving the magnetic head to an unloaded position away from the magnetic disk with the magnetic head still positioned over the radial track of the magnetic disk.

5. The method of claim 4, wherein the support member comprises an actuator body of the disk drive that positions the magnetic head over the disk.

6. The method of claim 5, wherein the step of moving the magnetic head to an unloaded position occurs responsive to a fault condition.

7. The method of claim 6, wherein the fault condition results from a contaminate particle on the disk, a decrease in radial velocity of the disk, or a power loss to the disk drive.

8. An apparatus for reading/writing data from/to a magnetic disk, comprising:
   an actuator body:
   an objective lens disposed in the actuator body, the objective lens to focus laser light onto the magnetic disk; and
   a magnetic head suspension assembly attached to the actuator body, the magnetic head suspension assembly including:
   a magnetic recording head;
   a suspension arm having a proximate end fixedly attached to the actuator body, a distal end with a tab, and a gimbal located between the distal and proximate ends, the magnetic recording head being attached to the gimbal; and a mechanism having an extending member moveable in a first direction to engage and move the tab until the magnetic recording head is placed in an unloaded position away from the magnetic disk, the extending member being moveable in a second direction to release the tab such that the magnetic recording head is placed in a loaded position in close proximity to the magnetic disk for writing operations.

9. The apparatus of claim 8 wherein the mechanism comprises:

a cam rotatably attached to a side of the actuator body;

an engagement arm having a first end fixedly attached to the cam, with the extending member being attached to a second end.

10. The apparatus of claim 9, wherein the mechanism further comprises:

a first pin attached to the side of the actuator body, an end surface of the cam being in contact the first pin;

a second pin to engage the cam, the second pin being moveable to rotate the cam.

11. The apparatus of claim 10, wherein the mechanism further comprises:

a spring coupled between the first and second pins to maintain a pressure of the end surface of the cam against the first pin sufficient to hold the magnetic recording head in either the loaded or unloaded positions.

12. The apparatus of claim 11, wherein the magnetic recording head comprises:

a slider having an opening between a top and a bottom surface, the opening providing a channel for the laser light to pass through; and an annular magnetic coil attached to the bottom surface of the slider around the opening.

13. The apparatus of claim 8, wherein the objective lens is de-coupled from the magnetic recording head so that reading operations can take place when the magnetic recording head is in the unloaded position.

14. The apparatus of claim 8, wherein the actuator body includes a focus actuator for focusing the laser light through the objective lens.

15. The apparatus of claim 14, wherein the actuator body further includes a tracking actuator coupled to the objective lens for fine positioning of the laser light on the magnetic disk.

16. A head suspension assembly of a magneto-optical (MO) drive comprising:

a magnetic recording head;

a suspension arm formed of a single piece of material to have a proximate end for attachment to a support member of the MO drive, a distal end with a tab, and a gimbal located between the distal and proximate ends, the magnetic recording head being attached to the gimbal; the suspension having an associated spring force to cause the magnetic recording head to fly at a height above a spinning disk surface of the MO drive when in a loaded position, in an unloaded position the tab being engaged by a extending member of the MO drive such that the magnetic recording head is positioned away from the spinning disk surface.

17. The head suspension assembly of claim 16, wherein the magnetic recording head comprises:

a slider having top and bottom surfaces, a leading edge, and an opening, the opening being located between the top and bottom surfaces to provide a channel for the laser light to pass through; and an annular magnetic coil attached to the bottom surface of the slider around the opening.

18. The head suspension assembly of claim 17, wherein the bottom surface comprises an air-bearing surface raised above a recessed surface, the leading edge meeting the air-bearing surface at a right angle.

19. The head suspension assembly of claim 18, wherein the magnetic coil is seated to be flush with the recessed surface.

20. The head suspension assembly of claim 16, further comprising a mounting plate attached to the proximate end of the suspension arm, the mounting plate being attached to the support member at a beveled angle that sets the associated spring force of the suspension arm.

21. The head suspension assembly of claim 16, wherein the gimbal comprises an outer annular ring joined to the suspension arm by a first pair of tabs located along a first axis, and an inner annular ring joined to the outer annular ring by a second pair of tabs located along a second axis, the first and second axes being orthogonal to one another, with the magnetic recording head being attached to the inner annular ring.

22. The head suspension assembly of claim 21, wherein the first and second pairs of tabs are each tiered such that the gimbal comprises a two-tiered structure.

* * * * *